N. E. FUNK & L. P. WHITAKER.
APPARATUS FOR REMOVING SEED AND SEED PODS FROM FLAX.
APPLICATION FILED APR. 3, 1914.
1,145,011. Patented July 6, 1915.
3 SHEETS—SHEET 2.
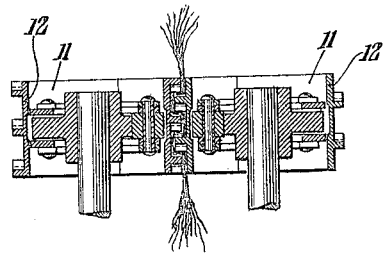
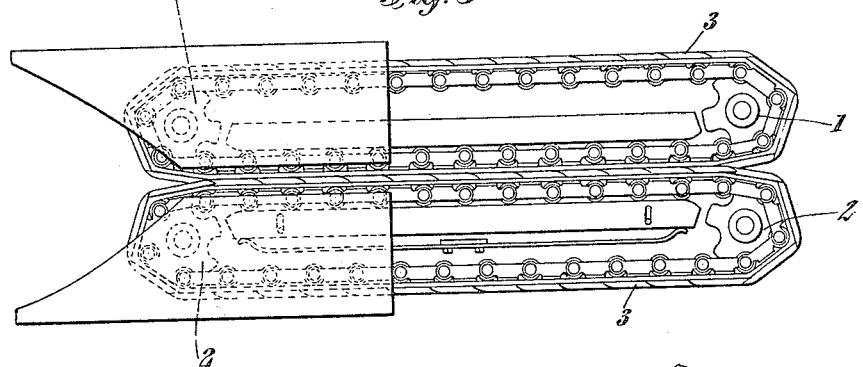
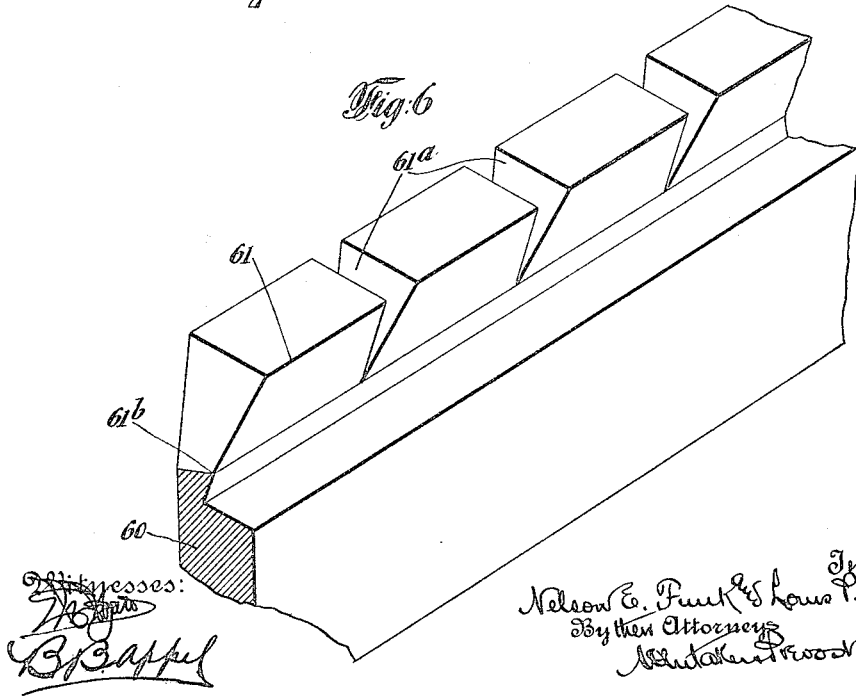

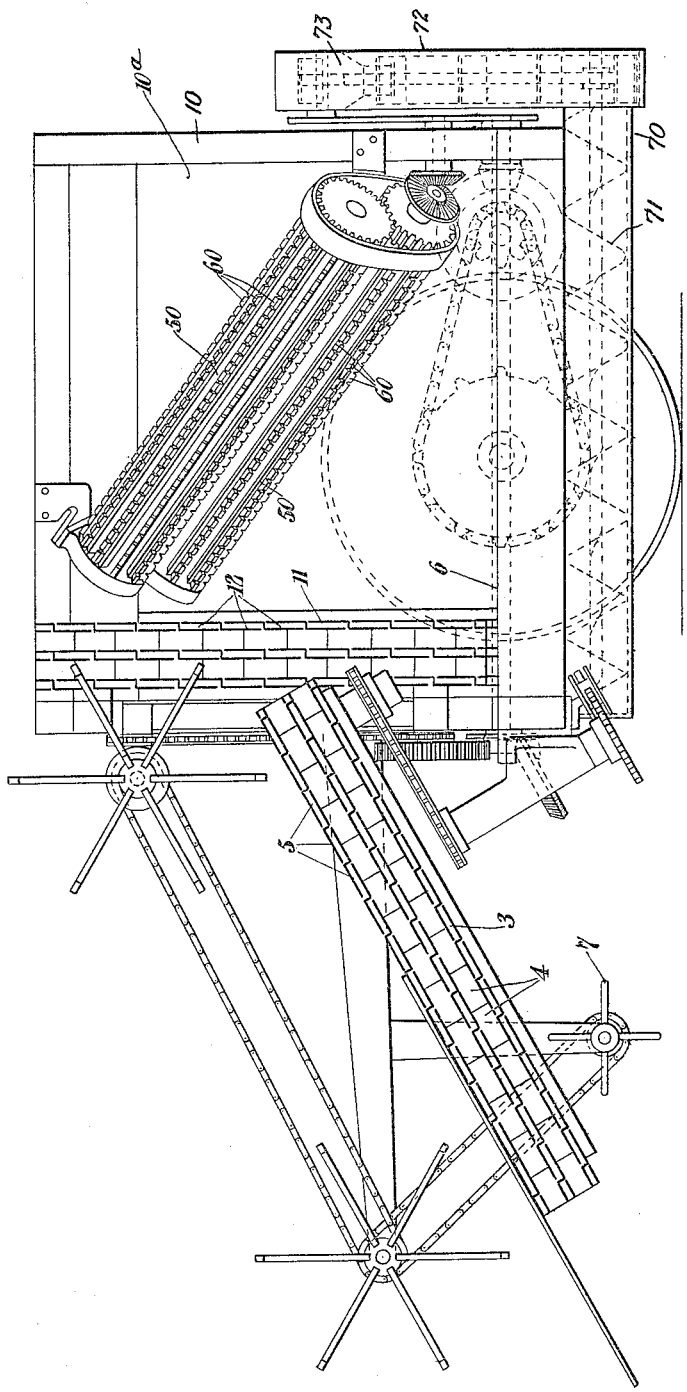

N. E. FUNK & L. P. WHITAKER.
APPARATUS FOR REMOVING SEED AND SEED PODS FROM FLAX.
APPLICATION FILED APR. 3, 1914.
1,145,011.
Patented July 6, 1915.
3 SHEETS—SHEET 3.
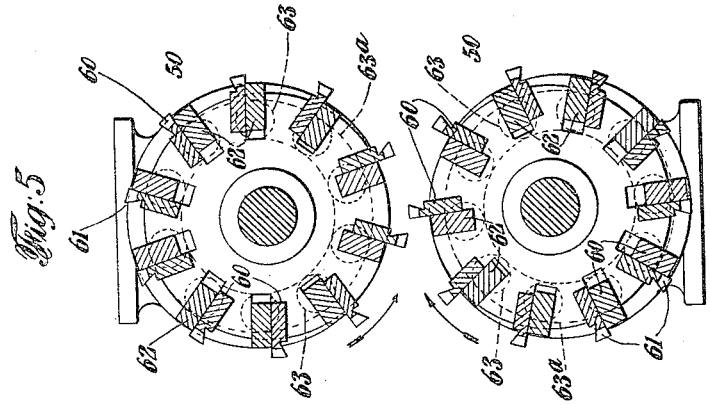
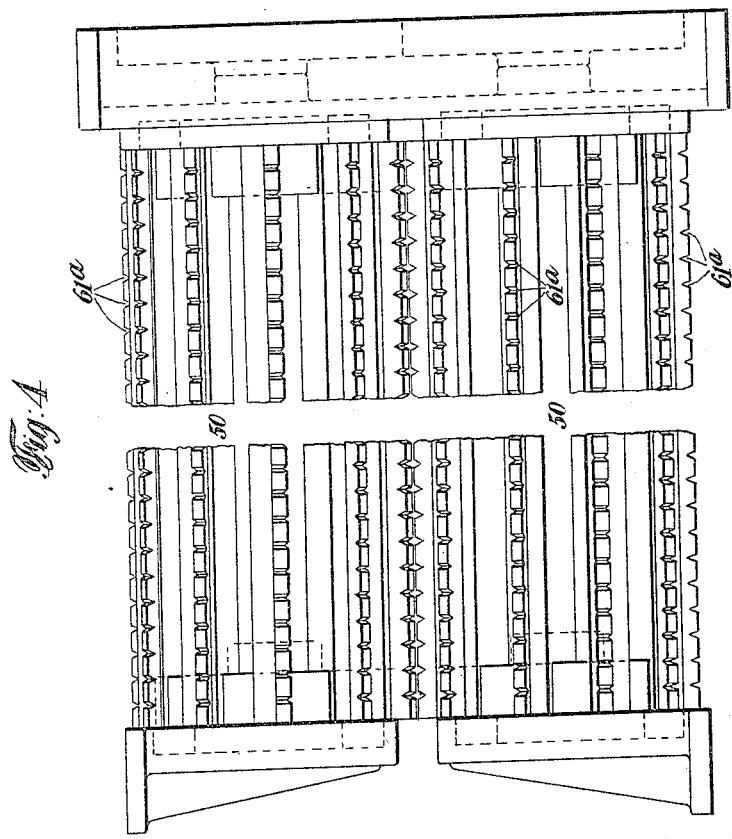

UNITED STATES PATENT OFFICE.

NELSON E. FUNK, OF MONTCLAIR, NEW JERSEY, AND LOUIS P. WHITAKER, OF NEW YORK, N. Y.; SAID FUNK ASSIGNOR TO VICTOR E. FREEMAN, OF NEW YORK, N. Y.

APPARATUS FOR REMOVING SEED AND SEED-PODS FROM FLAX.

1,145,011.        Specification of Letters Patent.        Patented July 6, 1915.

Application filed April 3, 1914. Serial No. 829,214.

*To all whom it may concern:*

Be it known that we, NELSON E. FUNK, a citizen of the United States, residing at Montclair, in the county of Essex and State of New Jersey, and LOUIS P. WHITAKER, residing at New York, in the county of New York and State of New York, have invented new and useful Improvements in Apparatus for Removing Seed and Seed-Pods from Flax; and we do hereby declare the following to be a full, clear, and exact description of the invention, such as will enable others skilled in the art to which it appertains to make and use the same.

Our invention consists in the novel features hereinafter described, reference being had to the accompanying drawings, in which we have shown one embodiment of our invention selected by us for purposes of illustration and the said invention is fully disclosed in the following description and claims.

Referring to the said drawings, Figure 1 represents a longitudinal sectional view taken through a flax harvesting machine embodying our invention between the opposing pulling chains of one of the pulling units, and showing in elevation our improved mechanism for removing the seed pods and cups from the plant, and for collecting the detached seed pods. Fig. 2 represents a transverse sectional view through one of the pulling units. Fig. 3 is a top plan view of one of the pulling units. Fig. 4 is an elevation of the cleaning rolls, the center portion being broken away. Fig. 5 represents a sectional view of the rolls. Fig. 6 is an enlarged perspective view of one of the cleaning bars.

Flax is ordinarily harvested in one of two ways, according to the use to which the product is to be put, if the seed is to be used for the production of linseed oil, or other linseed products, the stalks are ordinarily cut and thereafter threshed for the removal of the seed in a manner not unlike that used in connection with other grain. When, however, the flax is desired in order that its fiber may be extracted for the manufacture of linen, it is found that satisfactory commercial results are not obtained if the flax is cut and that it is necessary that the plant should be pulled together with the roots from the ground. This is a recognized fact in the harvesting of flax and it is also found that the removal of the root from the ground leaves the ground in better condition for the successive crops. The pulling of flax is ordinarily accomplished by hand and is very expensive on account of the labor involved. It will be apparent that where flax is harvested for the purpose of producing linseed products the straw is a loss and yields no return to the farmer, and on the other hand where the flax is pulled for the purpose of utilizing the fiber it is practically impossible to obtain the seed commercially as the plants are ordinarily pulled in a somewhat immature state and the seed is lost.

We have recently devised and constructed an apparatus for the purpose of pulling the flax from the ground together with the roots without the use of hand labor and for further operating upon the pulled stalks for the purpose of removing the seed pods therefrom, the stalks on the one hand and the seed and any adhering particles of the plants on the other hand being separately discharged from the machine and separately collected, preferably by binding the cleaned stalks and delivering them in bundles from the machine and by delivering the seed pods, etc., into bags or suitable receptacles so that they may thereafter be dried and threshed and cleaned for the preservation of the seed. The pulling mechanism of our apparatus, which we prefer to employ, forms the subject matter of a separate application for Letters Patent of the United States filed coincidentally with this application and will not be specifically claimed herein, and our present application is directed more particularly to the specific mechanism for cleaning the seed pods from the stalks. It should be understood, however, that while we prefer to employ this cleaning mechanism as a part of our complete apparatus for the purpose of operating upon the pulled stalks while they are passing through the machine, the apparatus is capable of being used in conjunction with other forms of pulling mechanism or cutting mechanism, or other mechanism for severing the stalks from their engagement with the ground either by hoeing, cutting, or otherwise, and regardless of whether the cleaned stalks are discharged from the machine or bound and discharged in bundles, and it is further to be understood that our specific cleaning mechanism may be used independently of the other parts of the mechanism herein referred to for the purpose of cleaning the seed from the flax or for any other analogous purpose for which it may be or may hereafter be found to be applicable.

In the removal of the seed pod from the plants where the stalks are to be utilized in the production of fiber, it has been found that the base of the seed cup or pod, which comprises a tiny button, adheres very strongly to the end of the branch of the plant on which it grows and is apparently intimately connected with the extreme ends of the fibers terminating at such button, and the presence of such cups or buttons persists in the after treatment of the fiber so as to form irregularities almost like knots in the yarn or thread made from the fibers. It is therefore extremely desirable to eliminate these buttons as far as possible in separating the seed pods from the plants and thereby to eliminate them from the fiber. The special cleaning mechanism hereinafter described and claimed is especially adapted to separate substantially all of the buttons or seed pod bases as well as the pods and seeds from the plants, so that the stalks are entirely free or nearly so from these objectionable buttons. In Fig. 1 of the accompanying drawings, we have illustrated so much of our flax harvesting machine as is necessary for the complete understanding of the invention herein described and claimed. At the front of the machine are arranged a plurality of pulling units, disposed side by side, and as they are constructed exactly alike, a brief description of one of these units will suffice for all of them. Our pulling unit comprises two endless carriers, in this instance sprocket chains passing over suitable sprocket wheels 1 and 2, the chains proper being indicated at 3—3, said chains being so arranged that they will provide parallel opposed portions disposed vertically or in other words on edge. These endless carriers are provided with ribs or projections, preferably disposed longitudinally with respect to the carriers, the ribs of one carrier alternating with those of the other, as indicated in Fig. 2. Said ribs ordinarily are carried by plates which are attached to or formed integrally with the links of the chain to facilitate their passage around the sprocket wheel, the individual plates being indicated at 4 and the ribs being indicated at 5. The ribs of each plate are preferably narrower than the space between the ribs of the opposed plate so that the plants are bent out of a vertical line and into a serpentine position without bruising or breaking the stalks, and it has been found that this structure forms an endless grip which will securely hold one or any number of plants so as to prevent them from moving longitudinally with respect to the gripping plates. The carriers of each unit are driven preferably at the same speed as the forward advance of the apparatus over the ground and the result is that as the machine is drawn or otherwise propelled forward, the plants are taken in between the opposing plates of the carriers and are pulled out of the ground and carried up to the upper ends of the carriers where they are discharged upon a horizontal carrying apron 6, suitable devices, as beaters 7, being provided beneath the inclined pulling carriers for knocking off the adhering earth from the roots. The horizontal carrier collects the plants from all the pulling units and carries them horizontally to the cleaning mechanism which will now be described.

According to our invention the cleaning mechanism includes a gripping conveyer which grips the plants adjacent to the root end and carries them sidewise while keeping them in substantially parallel relation, and means for combing the stalks and branches of the plant longitudinally thereof in a direction away from the gripping conveyer which comprise a plurality of combing devices or bars which we term "cleaner bars" or "combing bars," provided with recesses to receive the stalks and branches, portions of the opposed edges of said recessed portions approaching each other so closely as to not only break off the pods and thus remove the seeds from the plants, but also to break off and remove the cups or "buttons" which constitute the bases of the seed pods and which would not be removed necessarily with the removal of the seed pods as the seed pods tend to crumble and part from the plant leaving the buttons adhering to the ends of the twigs or branches. The recessed portions of the combing or cleaner bars must therefore approach each other very closely at at least some portion of their opposed edges in order to break off these buttons and separate them from the fiber of the plants.

In the preferred form of our invention a plurality of combing or cleaner bars are arranged upon opposed cylinders or drums and are rotated at considerable speed in opposite directions so that their adjacent bars will operate at opposite sides of the stalks and comb them in a direction away from the gripping conveyer to remove the seed pods and buttons. The combing or cleaner bars are also preferably provided with means for keeping their recesses free from particles of the plant, preferably in the form of clearing bars, as hereinafter described. In Fig. 1 we have shown these devices arranged in an upwardly inclined portion 10 of the machine constructed in the general form of a self-binding harvester.

11, 11 represent a pair of endless carriers comprising sprocket chains provided with plates 12 constructed in all respects like a pair of the pulling chains heretofore described, and provided with longitudinally disposed ribs or projections alternating with those of the opposing carrier and clamping the plants in the same manner as shown in Fig. 2, by deflecting parts out of a straight line. This construction affords a firm grip on the ends of the plants and prevents them from being drawn endwise by the action of the cleaning bars. The cleaning cylinders, which are indicated at 50, 50, are preferably disposed angularly with respect to the travel of the clamping conveyers and in such manner that the extreme ends of the plants are first brought between the cylinders. To this end, as shown in Fig. 1, the lower ends of the cylinders are more remote from the conveyers than the upper ends. Each of said cylinders is provided with a plurality of cleaner bars 60 which extend from one end of the cylinder to the other, and are provided with overhanging forward edges 61, as best shown in Figs. 5 and 6. The projecting portions of each bar are provided at intervals with notches 61$^a$ which are V-shaped and terminate at the bottom of the recess in an edge 61$^b$ which inclines upwardly and forwardly, as shown in Fig. 6. In rear of each of our cleaner bars is a clearing bar 62, which is a plain bar of metal having a radial movement in the cylinder and provided at each end with a friction roller 63, the said friction rolls engaging eccentric grooves 63 in suitable housings at the opposite ends of the rollers so that the clearing bars are withdrawn into the cylinder at the portions of each roller where they approach the opposing roller and are projected at the opposite sides of the rollers, as shown in Fig. 5, for the purpose of pushing any branches or adhering particles of the plants out of the V-shaped notches and keeping them clear at all times, as will be readily understood. As the plants are passed longitudinally between the obliquely disposed cleaning cylinders, the outer extremities of the plants will first enter between said rollers and will be combed by the cleaning bars thereof, said cylinders being rotated in the direction of the arrows in Fig. 5. It will also be seen that the cleaning bars of one cylinder alternate with those of the other cylinder, so that there is no danger of cutting the plants, and the alternating action of the cleaning bars effects a thorough cleaning of the plants of seed pods and buttons by forcing the plants into intimate engagement with successive bars so that the portions carrying the seed pods are forced into the bottoms of the V-shaped notches 61$^a$ the diverging edges of which snap off not only the large pods but the more minute buttons at the ends of the twig portions.

The flat portions 61$^c$ of the outer edges of the cleaning bars between the recesses are preferably wider than the recesses 6 and facilitate the passage of the plants sidewise longitudinally of the rolls, and as the rolls are disposed obliquely, the outer ends are first combed and freed from the seed pods and buttons, and the action of the rollers gradually extends farther and farther toward the roots of the plants until all the pods and buttons are removed, when the plants are carried by the gripping conveyers out of engagement with the cleaning rolls and delivered on the other side of the inclined platform 10, thoroughly combed and in parallel relation, and they will then pass to the ordinary self binding mechanism, such as is in common use on a self binding harvester, and will be bound in suitable bundles, or they may be discharged on the ground as preferred. We prefer, however, to employ a self binding apparatus (not shown), but which is of usual and well known construction.

While we have shown our improved cleaning mechanism installed upon an upwardly inclined table or frame of the harvester, which is provided with our improved pulling mechanism, it is obvious that the cleaning apparatus could be similarly arranged on the ordinary self binding harvester, and the flax cut by the usual cutting mechanism, and delivered to this cleaning mechanism, if it is not desired to harvest the stalks for the production of fiber, and the stalks after being relieved of the seeds could be thereafter bound or not as preferred.

The severed seed pods, seed and small particles of the plants removed by the cleaning roller, are deflected downwardly by an inclined platform 10$^a$ supported by the frame 10 below the travel of the plants, and are received by a chute 70 preferably provided with a screw conveyer 71 or other suitable mechanism for conveying them rearwardly and delivering them preferably to an elevator 72, which carries them upwardly and discharges them through the chute 73 into a bag or other suitable receptacle at the rear end of the machine, as shown in Fig. 1, from which they may be removed and treated for the recovery of the seeds by threshing and cleaning in any suitable or well known manner. As before stated, the cleaning rollers herein shown and described may also be used independently or in connection with other mechanism for the removal of the seed pods and seed from flax plants and for other analogous purposes if desired.

What we claim and desire to secure by Letters Patent is:—

1. In mechanism for removing the seed pods from flax, the combination with means for gripping the plants near the root ends and holding them in substantially parallel relation, of combing devices provided with recessed portions to engage the stalks and branches of the flax plants, portions of the opposed edges of said recessed portions approaching each other so closely as to remove the buttons at the bases of the seed pods, and means for moving said combing devices longitudinally away from the root ends thereof.

2. In mechanism for removing the seed pods from flax, the combination with means for gripping the plants near the root ends and carrying them sidewise while maintaining them in substantially parallel relation, of combing bars provided with recesses to receive the stalks and branches of the flax plants, portions of the opposed edges of said recesses approaching each other so closely as to remove the buttons at the bases of the seed pods, and means for moving said cleaner bars longitudinally of the plants in a direction away from the root ends thereof.

3. In mechanism for removing the seed pods from flax, the combination with means for gripping the plants near the root ends and holding them in substantially parallel relation, of combing devices provided with recessed portions to engage the stalks and branches of the flax plants, portions of the opposed edges of said recessed portions approaching each other so closely as to remove the buttons at the bases of the seed pods, and means for removing said combing devices longitudinally away from the root ends thereof, and clearing devices for said recessed portions of the combing devices.

4. In mechanism for removing the seed pods from flax, the combination with means for gripping the plants near the root ends and carrying them sidewise while maintaining them in substantially parallel relation, of combing bars provided with recesses to receive the stalks and branches of the flax plants, portions of the opposed edges of said recesses approaching each other so closely as to remove the buttons at the bases of the seed pods, and means for moving said cleaner bars longitudinally of the plants in a direction away from the root ends thereof, and clearing devices for clearing the recessed portions of said bars.

5. In mechanism for removing the seed pods from flax, the combination with means for gripping the plants near the root ends and carrying them sidewise while maintaining them in substantially parallel relation, of combing bars provided with recesses to receive the stalks and branches of the flax plants, portions of the opposed edges of said recesses approaching each other so closely as to remove the buttons at the bases of the seed pods, and means for moving said cleaner bars longitudinally of the plants in a direction away from the root ends thereof, and clearing devices for each of said bars for clearing the recessed portions thereof.

6. In mechanism for removing the seed pods from flax, the combination with means for gripping the plants near the root ends and carrying them sidewise while maintaining them in substantially parallel relation, of combing bars provided with recesses to receive the stalks and branches of the flax plants, portions of the opposed edges of said recesses approaching each other so closely as to remove the buttons at the bases of the seed pods, and means for moving said cleaner bars longitudinally of the plants in a direction away from the root ends thereof, and a clearing bar adjacent to each of said cleaner bars and movable transversely with respect thereto for clearing the recessed portions thereof.

7. In mechanism for removing the seed pods from flax, the combination with gripping and carrying mechanism for engaging the plants adjacent to the root ends thereof and holding them in substantially parallel relation, of a pair of combing rollers provided with longitudinally disposed cleaner bars, the bars of one roller alternating with those of the other, and said bars being provided with notches in their outer edges, the edges of said notches approaching each other so closely as to remove the buttons at the bases of the seed pods, and means for rotating said rollers in opposite directions.

8. In mechanism for removing the seed pods from flax, the combination with gripping and carrying mechanism for engaging the plants adjacent to the root ends thereof and holding them in substantially parallel relation, of a pair of cleaner rollers provided with longitudinally disposed cleaner bars for combing the stalks and branches of the plants, the bars of one roller alternating with those of the other, and said bars being provided with V-shaped notches at intervals in their outer edges, said notches having their edges approaching each other so closely adjacent to the bottoms of the notches as to remove the buttons at the bases of the seed pods, and means for driving said rollers in opposite directions.

9. In mechanism for removing the seed pods from flax, the combination with means for gripping plants adjacent to their root ends and carrying them sidewise while holding them in substantially parallel relation, of a pair of cleaning rollers each provided with longitudinally disposed cleaner bars, the bars of one roller alternating with those of the other, said bars being provided with notches at their outer edges, the edges of said notches approaching each other so closely as to remove the buttons at the bases of the seed pods, said bars having overhanging forward faces, whereby the forward edges of said notches will be inclined and will tend to hold the stalks and branches in and draw the stem to the bottom of said notches, and means for driving said rollers in opposite directions.

10. In mechanism for removing the seed pods from flax, the combination with means for gripping plants adjacent to their root ends and carrying them sidewise while holding them in substantially parallel relation, of a pair of cleaning rollers each provided with longitudinally disposed cleaner bars, the bars of one roller alternating with those of the other, said bars being provided with notches at their outer edges, the edges of said notches approaching each other so closely as to remove the buttons at the bases of the seed pods, said bars having overhanging forward faces, and the bottom edges of said recesses being inclined from the said overhanging faces rearwardly toward the axis of the roller in which they are mounted, whereby the forward edges of said notches are inclined so as to tend to draw the stalks and branches in a direction toward the axis of the roller and the bottom of the recess presents an acute angular cutting edge, and means for rotating said rollers in opposite directions.

11. In mechanism for removing the seed pods from flax, the combination with means for clamping the plants adjacent to their root ends and carrying them sidewise while holding them in substantially parallel relation, of a pair of rotating combing devices provided with longitudinally disposed cleaning bars, each of said bars having a plurality of V-shaped notches formed therein and separated by straight portions to facilitate the travel of the branches and twigs from one notch to another longitudinally of the roller, the edges of said notches approaching each other so closely as to separate the buttons at the bases of the seed pods from the plants, and means for driving said rollers in opposite directions.

12. In mechanism for removing the seed pods from the flax, the combination with means for clamping the plants adjacent to the butt ends thereof, and carrying them sidewise, of a pair of cleaning rollers provided with cleaning bars having notches in their outer edges, each of said rollers being provided with clearing bars adjacent to said cleaning bars, and means for moving said clearing bars toward and from the centers of said rollers.

13. In mechanism for removing the seed pods from the flax, the combination with means for clamping the plants adjacent to the butt ends thereof, and carrying them sidewise, of a pair of cleaning rollers provided with cleaning bars having notches in their outer edges, each of said rollers being provided with clearing bars adjacent to said cleaning bars, friction rollers carried by said bars, and eccentric portions for engaging said rollers for moving the clearing bars inwardly and upwardly with respect to the centers of the rollers.

14. In mechanism for removing the seed pods from flax, the combination with gripping and carrying mechanism for engaging the plants adjacent to the root ends thereof and carrying them sidewise while holding them in substantially parallel relation, of combing mechanism comprising a plurality of cleaning bars, each of said bars being provided with notches, the edges of which approach each other so closely as to remove the buttons at the bases of the seed pods, said bars having overhanging forward faces, and means for moving said bars longitudinally with respect to the plants in a direction away from the root ends thereof.

15. In mechanism for removing the seed pods from flax, the combination with gripping and carrying mechanism for engaging the plants adjacent to the root ends thereof and carrying them sidewise while holding them in substantially parallel relation, of combing mechanism comprising a plurality of cleaning bars, each of said bars being provided with notches, the edges of which approach each other so closely as to remove the buttons at the bases of the seed pods, said bars having overhanging forward faces, and said notches having their bottom edges inclined away from the plants from front to rear to form an acute angular cutting edge at the front face of the bar, and means for moving said bars longitudinally of the plants in a direction away from the root ends thereof.

16. A cleaning roller for combing flax plants to remove the seed pods and buttons therefrom comprising a cylindrically arranged series of longitudinally disposed cleaning bars having their outer edges provided with notches to receive the stalks and twigs of the plants, the edges of said notches approaching each other so closely as to remove the buttons at the bases of the seed pods.

17. A cleaning roller for combing flax plants to remove the seed pods and buttons therefrom comprising a cylindrically arranged series of longitudinally disposed cleaning bars having their outer edges provided with notches to receive the stalks and twigs of the plants, the edges of said notches approaching each other so closely as to remove the buttons at the bases of the seed pods, each of said bars having an overhanging forward face, whereby the forward edges of said notches will be inclined in a direction to draw the stalks and twigs toward the axis of the roller and hold them in said notches.

18. A cleaning roller for combing flax plants to remove the seed pods and buttons therefrom comprising a cylindrically arranged series of longitudinally disposed cleaning bars having their outer edges provided with notches to receive the stalks and twigs of the plants, the edges of said notches approaching each other so closely as to remove the buttons at the bases of the seed pods, the bottom edges of said notches being inclined away from the stalks and branches from the front face of the bar rearwardly to form an acute angular cutting edge at the front face of the bar.

In testimony whereof, we affix our signatures, in the presence of two witnesses.

NELSON E. FUNK.
LOUIS P. WHITAKER.

Witnesses:
E. W. WYATT,
BERTHA B. APPEL.

Copies of this patent may be obtained for five cents each, by addressing the "Commissioner of Patents, Washington, D. C."